(12) United States Patent
Bolam

(10) Patent No.: US 7,670,493 B2
(45) Date of Patent: Mar. 2, 2010

(54) MOBILE VACUUM FLOTATION AND CLARIFICATION UNIT

(76) Inventor: David John Bolam, 212 N. Ridge Dr., Orange Park, FL (US) 32003

( * ) Notice: Subject to any disclaimer, the term of this patent is extended or adjusted under 35 U.S.C. 154(b) by 0 days.

(21) Appl. No.: 11/645,337

(22) Filed: Dec. 26, 2006

(65) Prior Publication Data

US 2008/0149567 A1 Jun. 26, 2008

(51) Int. Cl.
   *C02F 1/24* (2006.01)
(52) U.S. Cl. .............. 210/703; 210/707; 210/723; 210/726; 210/759
(58) Field of Classification Search .......... 210/703, 210/707, 221.1, 221.2, 806, 241, 202, 723, 210/726, 759
See application file for complete search history.

(56) References Cited

U.S. PATENT DOCUMENTS

| | | | | |
|---|---|---|---|---|
| 2,324,400 A | * | 7/1943 | Roberts et al. ............. | 210/703 |
| 2,360,811 A | * | 10/1944 | Kelly et al. ................. | 210/608 |
| 2,360,812 A | * | 10/1944 | Kelly et al. ................. | 210/608 |
| 3,705,650 A | * | 12/1972 | Gotte ........................ | 210/322 |
| 4,216,085 A | | 8/1980 | Chittenden | |
| 4,559,146 A | * | 12/1985 | Roets ........................ | 210/705 |
| 4,913,826 A | * | 4/1990 | Mannig et al. .............. | 210/707 |
| 4,975,195 A | | 12/1990 | Urbani | |
| 5,275,732 A | | 1/1994 | Wang et al. | |
| 5,472,619 A | * | 12/1995 | Holzhauer et al. .......... | 210/721 |
| 5,543,050 A | | 8/1996 | Roshanravan | |
| 5,702,612 A | | 12/1997 | Wang | |
| 5,766,484 A | | 6/1998 | Petit et al. | |
| 5,783,089 A | * | 7/1998 | Anderson et al. ........... | 210/703 |
| 6,599,418 B2 | | 7/2003 | Wang | |
| 6,649,067 B2 | | 11/2003 | Overath | |

* cited by examiner

*Primary Examiner*—Thomas M Lithgow
(74) *Attorney, Agent, or Firm*—Joseph P. Kincart

(57) ABSTRACT

A mobile apparatus and method of operation for the pretreatment of wastewater to remove and concentrate fats, oils, grease and settled solids using vacuum flotation and a clarifier and returning the pretreated wastewater to the source structure, tank or sewer system. The vacuum flotation process is enhanced by injecting hydrogen peroxide to increase the dissolved oxygen concentration and a cationic emulsion polymer as a coagulant to the wastewater prior to removal into the vacuum flotation tank by vacuum pumping.

1 Claim, 4 Drawing Sheets

SECTION VIEW

MOBILE VACUUM FLOTATION AND CLARIFICATION UNIT

BACKGROUND OF THE INVENTION

1. Field of Invention

This invention relates to the commercial and industrial wastewater pretreatment field.

The invention is a mobile apparatus and batch pretreatment process for removing fats, oils and grease (commonly referred to as FOG) and suspended solids from wastewater traps, grease interceptors, septic tanks, pumping station wet wells, storage tanks and other related sanitary collection and storage facilities. The batch process steps include chemical addition, vacuum pumping into a flotation tank, vacuum flotation, clarification, sludge removal and sludge storage. The settled solids and FOG are concentrated to approximately five (5) percent solids during the process and transferred to an on board storage tank. The pre-treated liquid is returned to the source structure or discharged to the local sanitary sewer system.

2. Description of the Prior Art

Wastewater generated by food service establishments is required by most plumbing codes to be discharged to a grease interceptor prior to entering the sanitary sewer system. The interceptor captures fats, oils and grease (FOG) as well as large food particles that can cause blockage and maintenance problems in the sewer system. To function properly, grease interceptors must be routinely pumped to remove the FOG and settled solids. The normal practice is to empty the interceptor by vacuum pumping into a tanker truck and then haul the tank contents to a wastewater treatment facility or sanitary landfill as described in U.S. Pat. Nos. 4,975,195 and 5,543,050. Because of the expense to haul this wastewater, a need has arisen for an effective and efficient method to separate the FOG and settled solids at the grease interceptor location.

Likewise, FOG generated by households or establishments without a grease interceptor is discharged directly to a sewer system where it accumulates in sewer pipes, manholes and especially in wastewater pumping stations. Where households and businesses employ an on-site treatment system, the FOG is captured in a septic tank which acts similar to the grease interceptor and prevents the grease from plugging the drainfield. Each of these structures may require periodic pumping to remove the FOG and settled solids for which the proposed invention may be utilized. For the purposes of this discussion, all of the devices or structures mentioned where FOG accumulates will be referred to as grease interceptors.

A number of in-situ methods have been proposed including both biological and physical methods and apparatus for FOG removal; however, none anticipate the proposed invention and generally rely on either aeration to promote biological decomposition of the FOG or gravity separation and removal after a predetermined quantity of FOG has accumulated within the interceptor.

Various stationary processes are used at wastewater treatment facilities for treatment of hauled food service establishment sludge and most involve a screening step followed by blending with septage or sewage sludge prior to digestion or lime stabilization. Dissolved gas flotation is a common wastewater treatment method, especially dissolved air flotation, for the treatment of wastewaters containing large quantities of oils and grease. Most involve either injecting compressed gas directly into a flotation tank through a diffuser mechanism or saturating a pressurized recycle stream with the dissolved gas and injecting the pressurized fluid into the tank. These flotation tanks are normally under atmospheric pressure and once the compressed gas or pressurized fluid enters the tank, the reduced pressure causes the dissolved gas to come out of solution forming tiny size bubbles of less than 100 microns which attach to oil droplets and other suspended solids and float to the surface of the tank where they are removed by skimming devices. Dissolved gas flotation tanks are generally stationary vessels and operate in a continuous flow-through mode several of which are described in U.S. Pat. Nos. 4,216,085; 5,702,612; 5,766,484; and 6,599,418.

Chemical addition of hydrogen peroxide to the influent flow to a flotation unit is presented in U.S. Pat. No. 6,649,067 but this process relies on a chemical reaction to occur in the presence of a catalyst on the walls of the flotation tank which causes the decomposition of the hydrogen peroxide to oxygen and water.

A combined coarse and fine bubble system is presented in U.S. Pat. No. 5,275,732 wherein vacuum flotation is identified as one of several fine bubble methods to be used for flotation. This invention is a two step operation with a coarse gas bubble mixing step followed by a fine gas bubble flotation both of which utilize a bubble chamber and distribution device within the chamber for creating and dispersing the coarse and fine bubbles.

Vacuum flotation technology is referenced in Wastewater Engineering: Treatment, Disposal, Reuse, Second Edition by Metcalf & Eddy, Inc., copyright 1979, McGraw-Hill Book Company as an industrial process wherein the wastewater to be treated is first saturated with air either directly in an aeration tank or by induction into the waste stream during pumping into the flotation tank. The tank is described as a covered, cylindrical tank wherein a partial pressure is applied to cause the dissolved air to come out of solution and rise to the surface forming a scum blanket which is removed by a skimming mechanism.

SUMMARY OF INVENTION

It is the object of this invention to provide a method for rapidly separating the FOG and settled solids from the wastewater removed from a grease interceptor and upon completion of the separation and clarification processes, to discharge the pretreated wastewater back into the grease interceptor. The first step of the invention utilizes enhanced vacuum flotation wherein, hydrogen peroxide and a cationic emulsion polymer are added to the interceptor immediately prior to removal into the vacuum flotation tank. The hydrogen peroxide increases the dissolved oxygen level in the wastewater and the polymer serves as a coagulant. During the vacuum removal of the interceptor contents, the hydrogen peroxide and polymer are completely mixed with the wastewater. After the interceptor is completely emptied into the vacuum flotation tank, the flotation tank is placed under a vacuum which reduces the partial pressure above the liquid in the tank. This reduction in partial pressure causes the dissolved oxygen to come out of solution forming tiny, micron size bubbles in the wastewater. These bubbles then attach to the coagulated FOG and suspended solid matter in the wastewater and float to the surface. Once the vacuum flotation process is complete, the tank is drained from a side mounted port to a pre-set level. An internal baffle prevents most of the float and heavy settled solids from exiting the tank with the wastewater. The captured float and settled solids are then transferred to a separate holding tank aboard the mobile unit.

The second step in the process is a two compartment clarifier for capturing any carry-over from the vacuum flotation unit. This clarifier is a combination cyclonic concentrator followed by a settling chamber equipped with parallel diffusion plates to reduce turbulence. The wastewater is discharged from the vacuum flotation tank at a high velocity into the cyclonic concentrator where the solid material is forced against the outer wall of the concentrator by centripetal force and moved to the bottom of the concentrator. Any grease or light float will migrate to the top of the concentrator where it is captured. The wastewater and solids are discharged from the bottom of the concentrator to the bottom of the settling chamber where the effluent rises and is discharged over a weir at the top. The parallel plates serve to prevent short circuiting and reduce turbulence as the flow moves upward and over the effluent weir. The settling chamber provides a quiescence zone to allow any heavy solids carryover to settle via gravity. Upon completion of draining the vacuum flotation tank through the clarification unit, the clarifier is allowed to stand idle until settling is complete and the solids are concentrated at the bottom. Then the upper portion of the clarifier is drained back into the grease interceptor. The concentrated solids and any float captured in the concentrator are then transferred to the flotation tank for re-treatment during the next cycle.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will be come apparent upon consideration of the following detailed description taken in connection with the accompanying drawings, wherein.

DETAILED DESCRIPTION OF THE PREFERRED EMBODIMENTS

Figure 1:
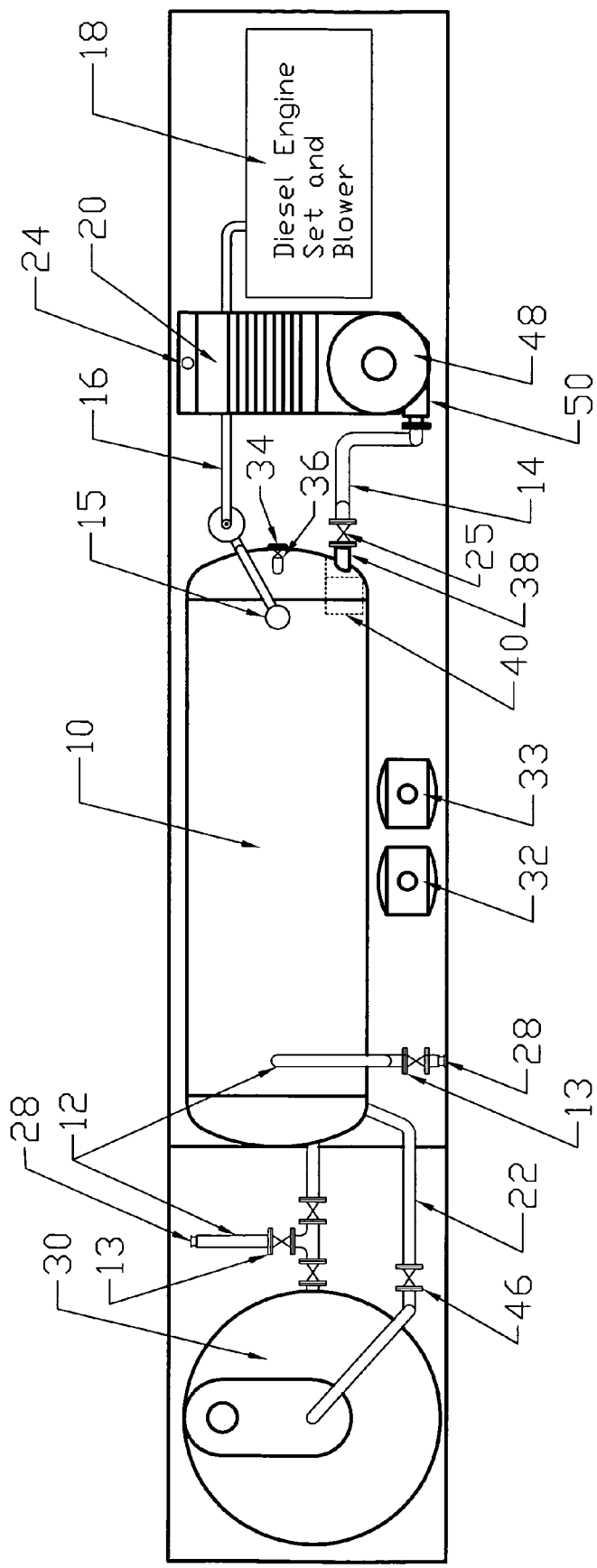
FIG. 1 is a plan view of the mobile vacuum flotation and clarification unit showing the general arrangement of the tanks, equipment, interconnecting piping, valves and appurtenances that embody the invention.
Figure 2:
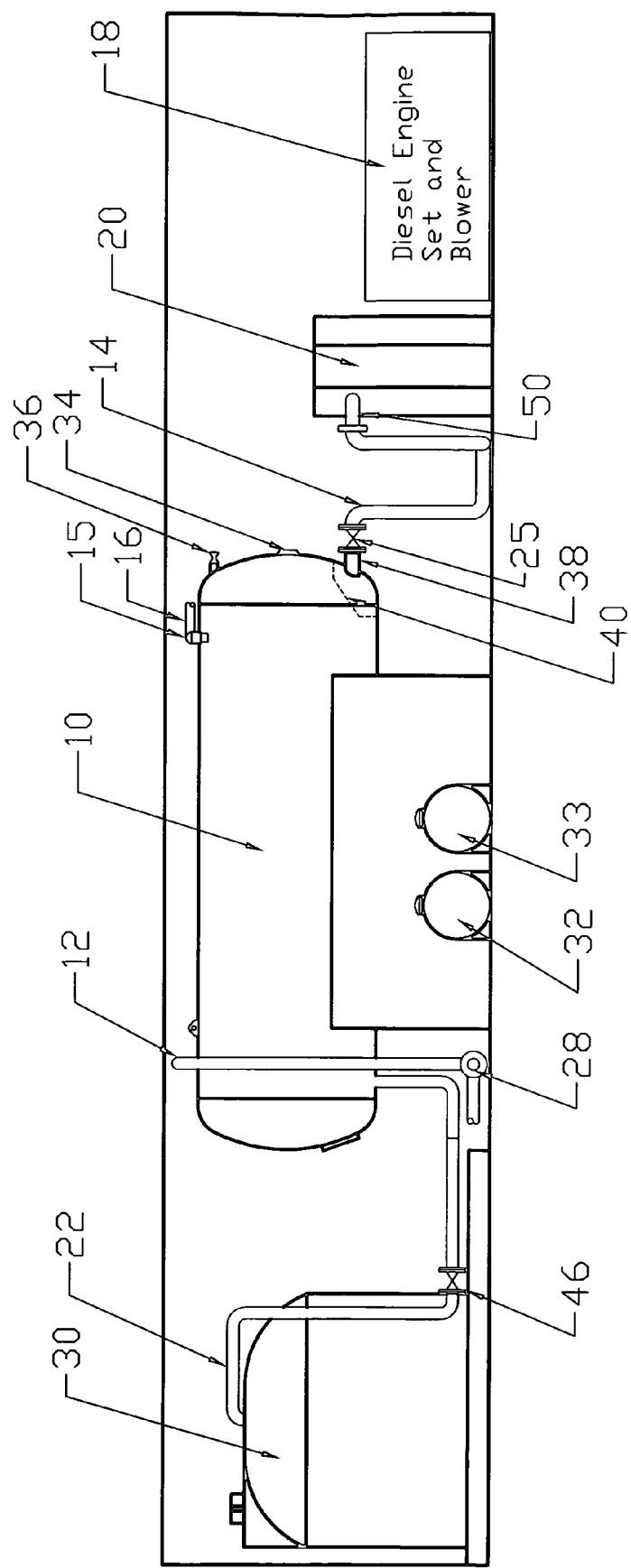
FIG. 2 is a cross sectional view of the mobile vacuum flotation and clarification unit mounted within an enclosed trailer. The details of the trailer are not shown.

Referring now to the drawings, in FIGS. 1, 2, 3, and 4 there is shown the preferred embodiments of the present invention composed of the vacuum flotation tank 10, and the clarifier 20, influent piping and valves 12, interconnecting piping and valve arrangement 14, vacuum flotation overfill protection valve 15, vacuum piping 16, diesel engine and blower unit 18, sludge removal piping and valve arrangement 22, clarifier discharge piping 24, clarifier drain valve 26, and sludge storage tank 30, hydrogen peroxide storage tank 32, and cationic polymer storage tank 33.

Hose connections 28 are provided on either side of the mobile unit to connect suction hoses that extend to the grease interceptor. With the connection hoses in place, hydrogen peroxide and cationic polymer are added to the interceptor through the open manhole and the end of the hose lowered to the bottom of the interceptor. Then the vacuum blower is engaged and the contents of the grease interceptor are removed and deposited in the vacuum flotation tank 10 through the influent piping and valve arrangement 12. Once inside the flotation tank, the influent valve 13 is closed and the flotation tank is placed under a vacuum. The flotation process is monitored through a sight port 34 located at one end of the floatation tank.

During the flotation process, the suction hose is disconnected from connection 28 and re-connected to the clarifier discharge piping 24 at hose connection 42. Then the clarifier discharge valve 44 is opened. Upon completion of the flotation process, the vacuum relief valve 36 is opened and the tank is drained through the discharge port 40 to the clarifier 20. An interior baffle 40 within the flotation tank prevents float from exiting the tank. After draining the flotation tank, the vacuum relief valve and clarifier discharge valve 44 are closed and sludge removal valve 46 is opened. The flotation tank is then placed under pressure by reversing the air flow to the tank from the blower and the captured sludge is discharged from the tank to the sludge holding tank through the sludge removal piping and valve arrangement 22 shown in FIGS. 1 and 2.

Figure 3:
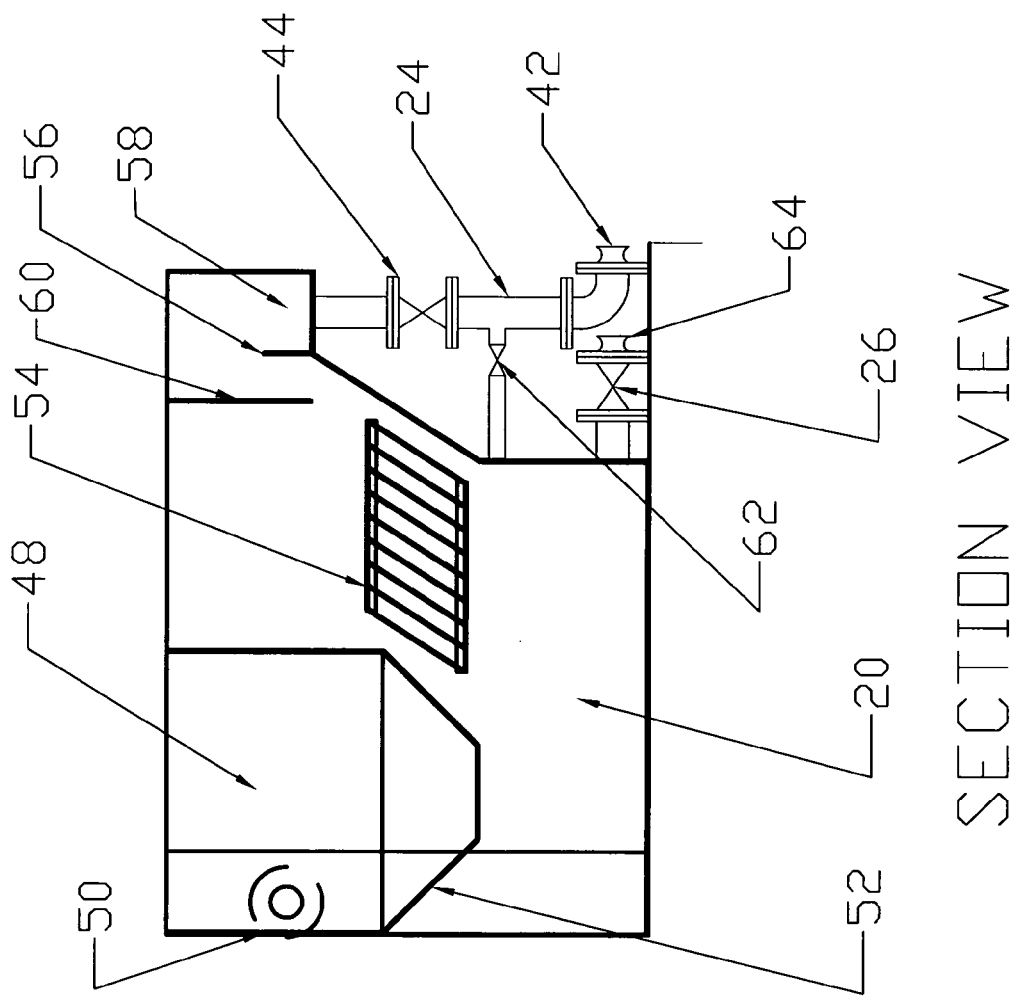
FIG. 3 includes a cross-section view of the clarification unit.
Figure 4:
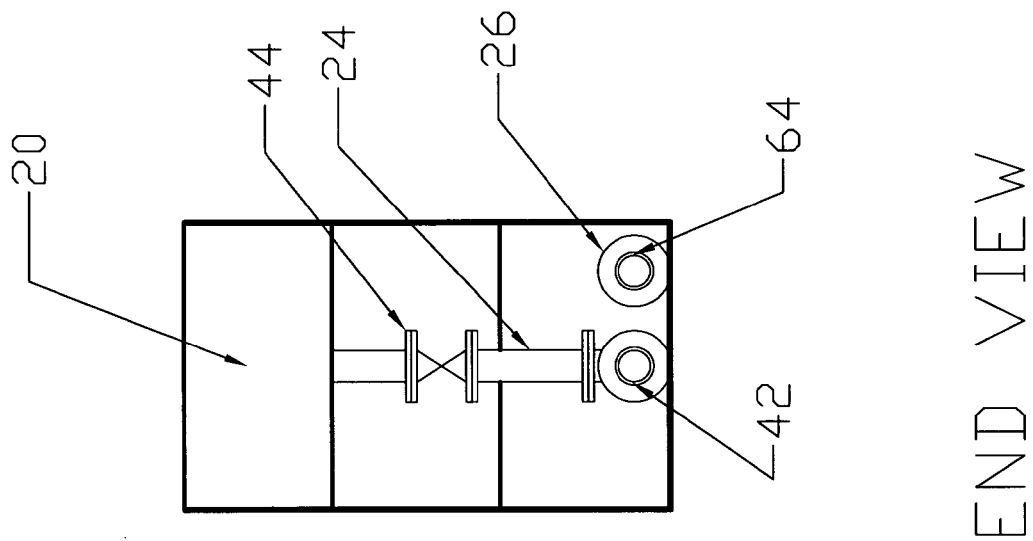
FIG. 4 includes an end view of the clarification unit.

FIG. 3 illustrates the various compartments of the clarification unit. The pretreated wastewater discharge from the flotation tank 10 enters the cyclonic concentrator 48 section of the clarifier through influent port 50 that is located tangential to the direction of flow in the cyclonic concentrator. The rate of flow to the clarifier can be controlled by valve 25. The tangentially fed influent causes the flow within the concentrator to move in a clockwise or counter clockwise motion depending on the placement of port 50. Either direction of flow is acceptable for the placement of influent port 50 to result in a circular movement of the flow within the concentrator. The discharge from the cyclonic concentrator section of the clarifier is at the bottom of the conical section 52. Therefore, the fluid motion in this compartment is circular and downward which causes any carryover floating material from the flotation tank to be concentrated against the walls of the compartment and captured.

The second compartment of the clarifier is the quiescence settling zone and includes parallel diffusion plates 54 to reduce turbulence promote settling of any carryover solids from the flotation tank. The flow pattern is upward and over the effluent weir 56 into the effluent launder 58. An underflow baffle 60 is provided in front of the effluent weir to prevent any floating material that may escape capture in the concentrator section from discharging over the weir. The final pretreated effluent is discharged from the effluent launder to the discharge piping 24 to hose connection 42 shown on both FIGS. 3 and 4. The hose is disconnected from the flotation tank influent and connected to the clarifier effluent prior to beginning the clarification step and the final pretreated effluent is drained back into the grease interceptor. Once the flotation tank is completely drained through the clarifier, the clarifier unit is allowed to stand idle for a short period to allow any suspended solids to settle in the clarifier. Then drain valve 62 is opened to drain the upper volume of the clarifier section back into the grease interceptor. The final step is to remove the captured sludge and float from the clarifier and return it to the flotation tank. This is carried out by disconnecting the hose from hose connection 42 and connecting to the clarifier drain hose connection 64. Then the opposite end of the hose is connected to hose connection 28 and clarifier drain valve 26 is opened along with influent valve 13. The vacuum blower is engaged and the clarifier is emptied into the flotation tank where it is stored and then re-treated at the next grease interceptor location.

Although a preferred embodiment of the invention has been illustrated in the accompanying drawings and described in the foregoing Detailed Description, it will be understood that the invention will not be limited to the embodiment disclosed, but is capable of numerous rearrangements and modifications of parts and elements without departing from the spirit of the invention.

What is claimed is:

1. A method for operating a mobile apparatus comprising a combination vacuum flotation and clarification unit to pretreat wastewater containing fats, oils and grease and settled solids, concentrating and removing said fats, oils, grease and settled solids and storing them on board the mobile apparatus in a sludge holding tank and discharging the pretreated wastewater back into a grease interceptor source structure, the method comprising the following steps:

adding hydrogen peroxide and cationic emulsion polymer to contents of a grease interceptor immediately prior to removal of interceptor wastewater via vacuum pumping, thereby mixing the hydrogen peroxide and cationic emulsion polymer with the contents of the grease interceptor during the removal;

removing via vacuum pressure the wastewater contents of the grease interceptor containing said hydrogen peroxide and cationic emulsion polymer through a hose connected to a hose connection and fill piping to a vacuum flotation tank, thereby coagulating the wastewater with said polymer and increasing a dissolved oxygen content of the wastewater with the peroxide and filling the flotation tank closing an influent valve for the flotation tank and allowing a vacuum blower to decrease a partial pressure above the water surface in the flotation tank which causes dissolved oxygen to come out of solution forming tiny gas bubbles of less than 100 microns which attach to coagulated solids and oily waste and float to the surface thereby forming a blanket of dense floating scum and solids of approximately 3 to 5 percent solids by dry weight and allowing heavy solids that will not float to settle to the bottom of the flotation tank;

opening a vacuum release valve and discharging pretreated wastewater through an internally baffled port above the bottom of the flotation tank, thereby retaining most of the floating and settled solids in the flotation tank and draining said pretreated wastewater through a control valve to regulate the rate of flow to a clarifier comprising two compartments for collecting concentration of carryover from the flotation tank and discharging final clarified effluent back into the grease interceptor through a hose connection;

closing a flotation tank pretreated wastewater drain valve and vacuum release valve;

opening a sludge drain valve for the flotation tank and reversing an air flow into the flotation tank, thereby pressurizing said tank and forcing sludge through sludge drain piping and into a sludge holding tank and essentially emptying the flotation tank;

closing a sludge drain valve;

opening an upper clarifier drain valve, thereby allowing the upper half of the clarifier to drain back into the grease interceptor through a two ended hose having a first hose connection;

closing the upper clarifier drain valve and clarifier discharge valve;

removing a first hose connection of the hose from the upper clarifier drain valve and connecting the first hose connection of the hose to the lower clarifier drain;

connecting the second end of the hose to the flotation tank at an influent hose connection; and opening a lower clarifier drain and a flotation influent valves, and reversing an air flow on a blower to create a vacuum to withdraw lower clarifier contents into the flotation tank, thereby empty the clarifier and return the contents to the flotation tank.

* * * * *